United States Patent
Speckhart et al.

(10) Patent No.: US 6,864,786 B2
(45) Date of Patent: Mar. 8, 2005

(54) INTEGRATED WARNING DEVICE FOR PROVIDING FLASHING BRAKE LIGHTS

(75) Inventors: Frank H. Speckhart, Knoxville, TN (US); Nathan T. Davis, Knoxville, TN (US); Anthony L. Spezia, III, Knoxville, TN (US); Benjamin S. Jordan, Knoxville, TN (US)

(73) Assignee: C2 Innovations, Inc., Knoxville, TN (US)

( * ) Notice: Subject to any disclaimer, the term of this patent is extended or adjusted under 35 U.S.C. 154(b) by 0 days.

(21) Appl. No.: 10/367,330

(22) Filed: Feb. 14, 2003

(65) Prior Publication Data

US 2004/0160315 A1 Aug. 19, 2004

(51) Int. Cl.$^7$ .................................................. B60Q 1/50
(52) U.S. Cl. ................. 340/467; 340/479; 200/61.45 R
(58) Field of Search .......................... 340/467, 479, 340/464; 200/61.45 R

(56) References Cited

U.S. PATENT DOCUMENTS

| | | |
|---|---|---|
| 4,097,842 A | 6/1978 | Zalar et al. |
| 4,107,647 A | 8/1978 | Yoshino |
| 4,258,353 A | 3/1981 | Carlson |
| 4,320,384 A | 3/1982 | Carlson |
| 5,043,698 A | 8/1991 | Tabacchi |
| 5,150,098 A | 9/1992 | Rakow |
| 5,309,141 A | 5/1994 | Mason et al. |
| 5,594,416 A | 1/1997 | Gerhaher |
| 5,767,589 A | 6/1998 | Lake et al. |
| 5,786,752 A | 7/1998 | Bucalo et al. |
| 5,900,679 A | 5/1999 | Lake et al. |
| 5,909,173 A * | 6/1999 | Mason et al. ............... 340/467 |
| 6,020,814 A | 2/2000 | Robert |
| 6,031,451 A | 2/2000 | Graves et al. |
| 6,130,609 A * | 10/2000 | Huang ........................ 340/467 |
| 6,225,896 B1 | 5/2001 | Sendowski |
| 6,249,219 B1 | 6/2001 | Perez et al. |
| 6,278,364 B1 | 8/2001 | Robert |
| H2001 H | 11/2001 | Pinkus |
| 6,326,888 B1 | 12/2001 | Wang |
| 6,367,949 B1 | 4/2002 | Pederson |
| 6,380,865 B1 | 4/2002 | Pederson |
| 6,424,256 B1 * | 7/2002 | Ryder ........................ 340/479 |

* cited by examiner

Primary Examiner—Jeffery Hopsass
Assistant Examiner—Jennifer Stone
(74) Attorney, Agent, or Firm—Pitts & Brittian, P.C.

(57) ABSTRACT

A deceleration warning device for providing a visual indication of severe vehicular deceleration to the driver of a following vehicle. The deceleration warning device independently detects severe deceleration through an onboard accelerometer and is installed by securing the device to an existing OEM brake light/taillight fitting of a vehicle. The deceleration warning device is installed in the vacancy of a taillight lamp, and includes an illumination element that serves as a taillight, a brake light, and a severe deceleration indicator.

12 Claims, 6 Drawing Sheets

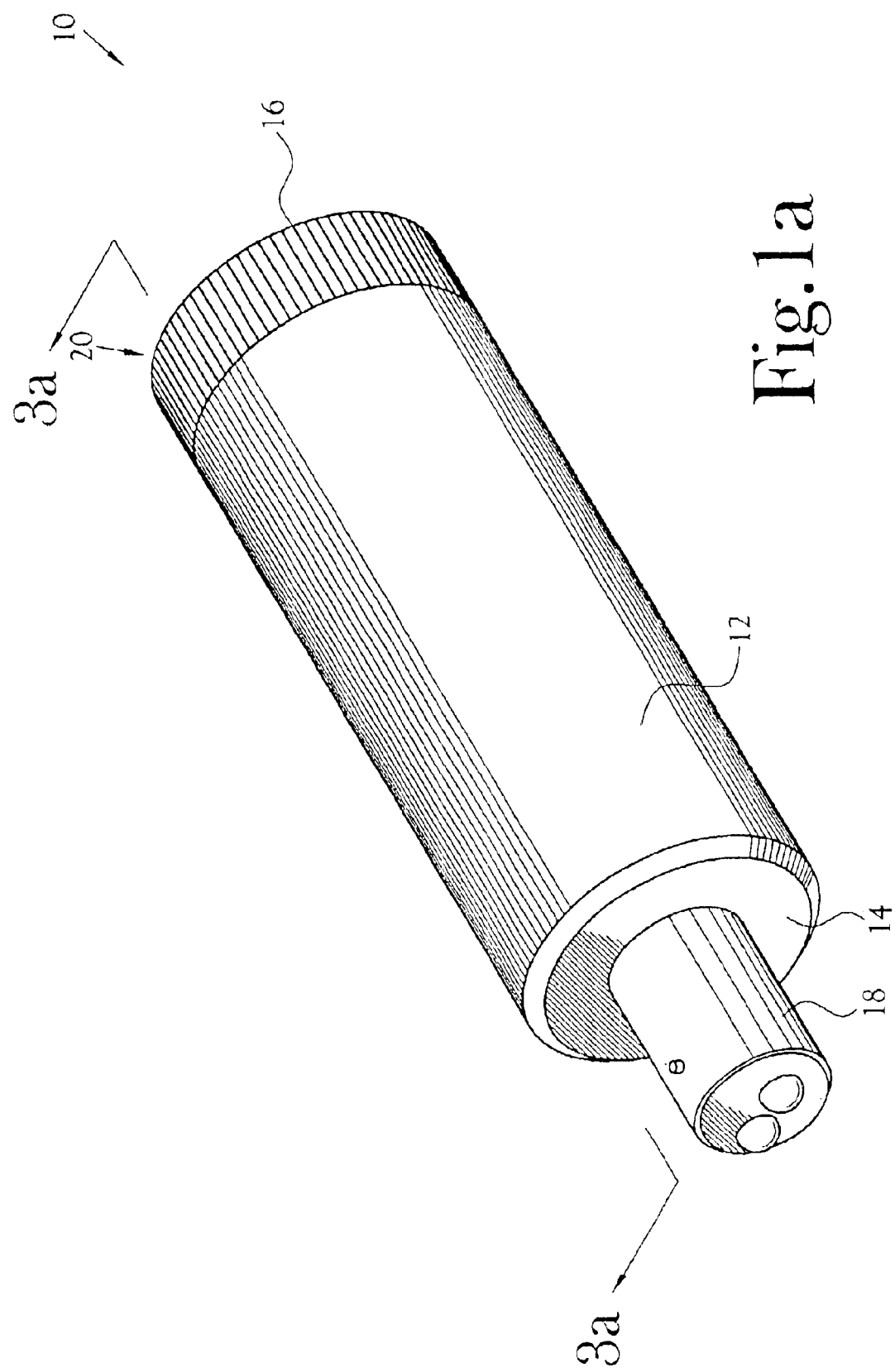

INTEGRATED WARNING DEVICE FOR PROVIDING FLASHING BRAKE LIGHTS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a device for visually indicating an abnormally intense deceleration of a vehicle. More particularly, this invention pertains to a self-contained device for detecting and visually indicating to following drivers a vehicle deceleration that exceeds a predetermined deceleration threshold.

2. Description of the Related Art

Many automobile accidents that inflict injury or death on those involved are "rear end" collisions. Typically, this type of accident is the result of a driver of a following vehicle lacking knowledge of the rate of deceleration of the leading vehicle. Current vehicles are equipped with conventional brake lights, which illuminate in accordance with the application of the braking mechanism. However, conventional brake lights reveal no indication as to the severity of the deceleration of a leading vehicle, leaving the driver of a following vehicle unaware of a need for rapid deceleration.

Currently, there are several deceleration warning systems disclosed. For example, the system disclosed in U.S. Pat. No. 5,801,624 issued to Tilly et. al. visually indicates the rate of deceleration of a vehicle. However, this system cannot independently calculate deceleration. More specifically, the system utilizes the accelerometer of an anti-lock brake system (ABS) to accomplish the calculation. Similarly, the systems disclosed in U.S. Pat. Nos. 5,043,698 issued to Tabacchi, 4,097,842 issued to Zalar et. al., and 5,786,752 issued to Bucalo et. al. calculate deceleration utilizing the speedometer of a vehicle, the ignition of a vehicle, and the brake pedal of a vehicle respectively. Because this type of system requires vehicular based components to calculate deceleration, it is limited in that it presents compatibility issues and an intricate installation process.

Other deceleration warning systems, such as the system disclosed in U.S. Pat. No. 5,150,098 issued to Rakow, require the installation of additional equipment. The Rakow system includes a visual warning device that must be mounted on a pedestal at the rear of a vehicle. Similarly, the system disclosed in U.S. Pat. No. 4,107,647 issued to Yoshino requires the mounting of the included emergency flashers. Further, conventional deceleration warning systems require the permanent mounting of a packaging that contains the components of the device. This type of system is limited in that the installation of additional equipment is inconvenient or expensive. Also, the addition of required equipment occupies the limited space offered by a vehicle and may be visually unappealing to the user.

Deceleration warning systems, such as the systems disclosed in U.S. Reg. No. H2,001 issued to Pinkus and U.S. Pat. No. 5,309,141 issued to Mason et. al., include a source of light that must be electrically integrated into the existing electrical wiring of a vehicle. Also, the system disclosed in U.S. Pat. No. 6,225,896 issued to Sendowski requires the manipulation of the electrical wiring of a vehicle in order to utilize existing light sources. These systems are limited in that they present intricate installation processes and introduce unnecessary risks associated with the manipulation of the electrical wiring of a vehicle.

BRIEF SUMMARY OF THE INVENTION

In accordance with the present invention there is provided an integrated warning device for providing a flashing, visual indication of severe vehicular deceleration to the driver of a following vehicle. The warning device is self-contained, detects severe deceleration through an onboard accelerometer, and fits any standard OEM brake light fitting of a passenger car, truck, trailer, or other motor vehicle that employs brake indicator lights. More specifically, the accelerometer is a self-contained device that independently detects severe vehicular deceleration which is sensed by the electrical circuitry of the warning device. The electrical circuitry energizes the illumination element which also serves as the brake light, according to the behavior of the equipped vehicle. The mounting element reduces the installation of the warning device to that of a replacement taillight lamp. The discussed characteristics reveal the warning device to exhibit a plug-and-play feature in that when the device is installed, it is immediately fully operational. The warning device is installed in the fitting of a taillight lamp, and its illumination element serves as a taillight, a brake light, and a severe deceleration indicator.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1a is a perspective view of a warning device constructed in accordance with various features of the present invention;

FIG. 3b is a partially sectional side elevation view illustrating an alternate configuration of the accelerometer of FIG. 3a;

DETAILED DESCRIPTION OF THE INVENTION

One embodiment of an integrated warning device for being mounted in the taillight fitting of a conventional motor vehicle and constructed in accordance with various features of the present invention is illustrated generally at 10 in FIG. 1. The warning device 10 provides a visual indication of severe vehicular deceleration to the driver of a following vehicle. More specifically, the warning device 10 independently detects severe deceleration through an onboard accelerometer and is installed by securing the device to an existing OEM brake light/taillight fitting of a vehicle. Because the warning device 10 is installed in the vacancy of a brake light lamp, it includes an illumination element that serves as a taillight, a brake light, and a severe deceleration indicator.

Figure 1B:
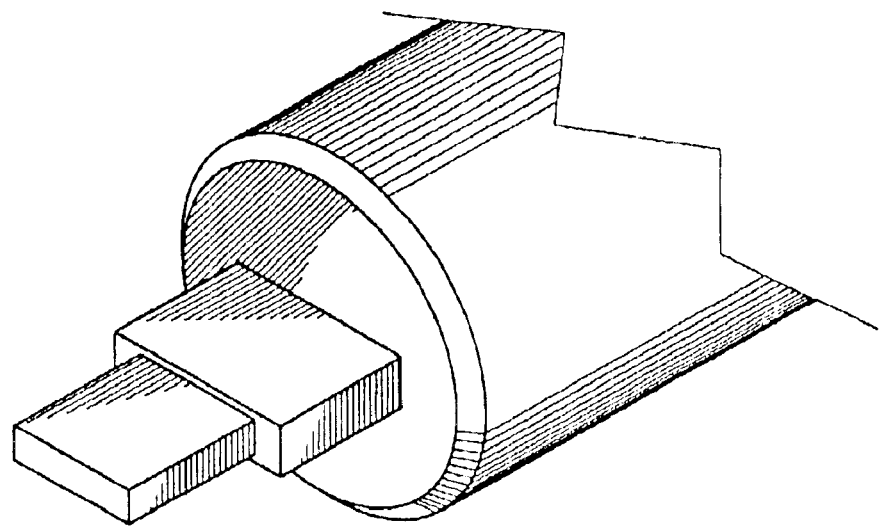
FIG. 1b is a partial perspective view of the warning device of FIG. 1 illustrating a wedge-type connector.
Figure 1C:
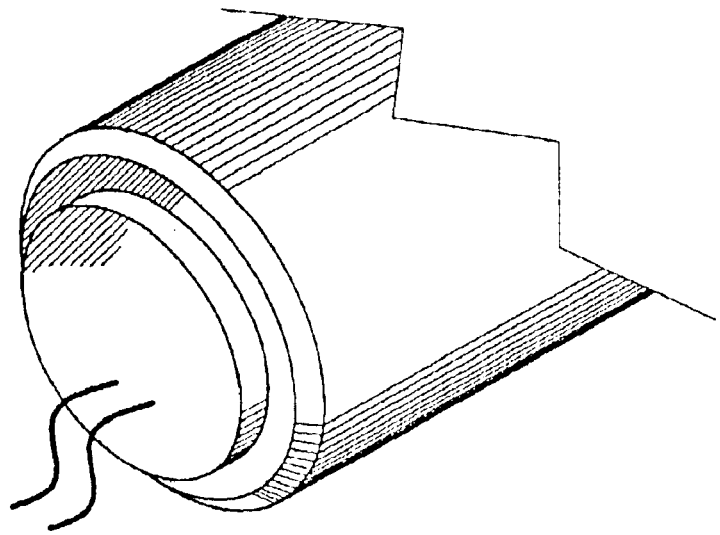
FIG. 1c is a partial perspective view of the warning device of FIG. 1 illustrating a connector for a heavy truck.

In the embodiment shown in FIG. 1, a housing 12 having a cylindrical contour includes a first end 14 and a second end 16. In the illustrated embodiment, a bayonet-type connector 18 is disposed at the first end 14 and cooperates with OEM brake light/taillight fittings such that when secured to such a fitting, the warning device 10 establishes electrical communication with the corresponding vehicle in a conventional manner. Those skilled in the art will recognize that a conventional connector other than a bayonet-type connector, such as a wedge connector illustrated in FIG. 1b or a heavy truck connector illustrated in FIG. 1c, may be used without interfering with the scope or spirit of the present invention. Once secured in the taillight fitting, the device requires no further installation, thus presenting a plug-and-play type feature. An illumination element that, in this embodiment, comprises an LED display 20 is disposed at the second end 16 of the housing and provides a vehicle with a brake light, a taillight, and a flashing severe deceleration indicator. In the preferred embodiment, the elements contained in the housing are sealed such that moisture and foreign particles are unable to penetrate the deceleration warning device 10.

Figure 2:
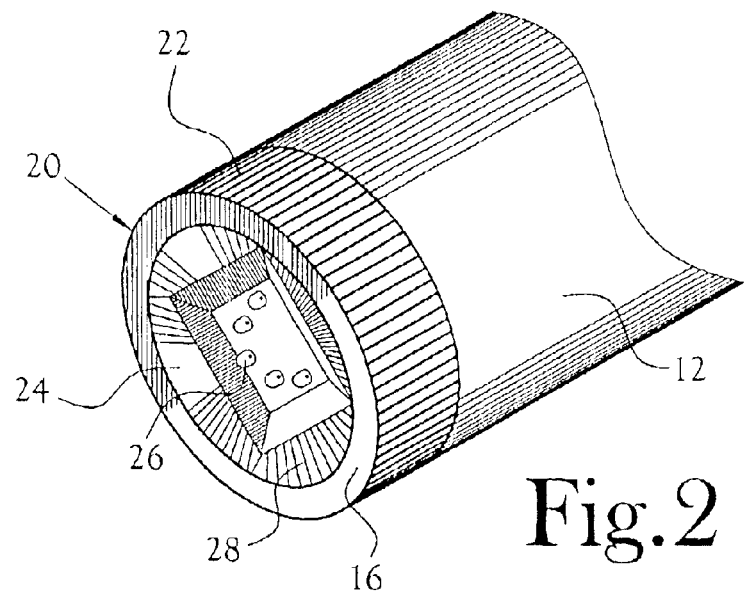
FIG. 2 is a partial perspective view of the warning device of FIG. 1 illustrating an illumination element which flashes during severe braking to warn following drivers.

FIG. 2 illustrates a partial perspective view of the warning device 10 and more clearly illustrates the LED display 20. This display 20 consists of an illumination element housing 22 and a transparent lens 24. In the illustrated embodiment, an array of LED's 26 is positioned in a parabolic configuration within the LED display 20. Encircling the array of LED's 26 is a reflector 28 employed to redirect the light from the display 20 in order to achieve optimal visibility for other drivers.

Figure 3A:
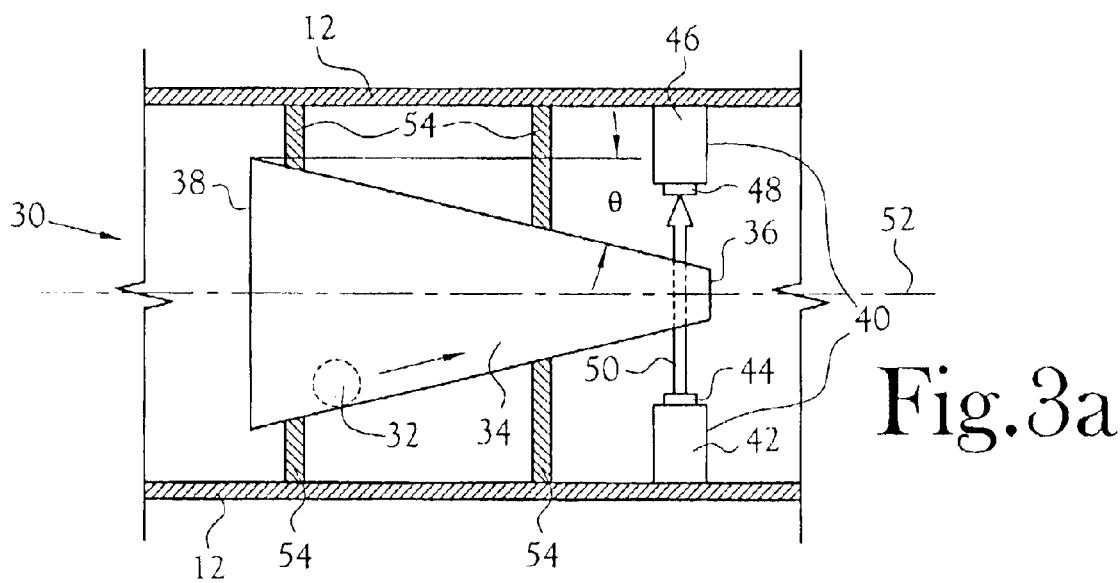
FIG. 3a is a partially sectional side elevation view of an accelerometer carried within the warning device and constructed in accordance with various features of the present invention.

FIG. 3a illustrates a perspective view of an accelerometer 30 in accordance with certain features the present invention. In this embodiment, the accelerometer 30 is a threshold accelerometer that generates an electrical signal upon the realization of a predefined deceleration threshold. To this end, the accelerometer 30 includes a mass member 32 that, in this embodiment, defines a sphere. This mass member 32 travels through a guide 34 which is conically shaped in the depicted embodiment. The guide 34 is fabricated from a transparent material in the preferred embodiment and includes a tapered end 36, a base end 38, and an enclosure that accommodates the mass member 32. The guide 34 permits the unrestricted movement of the mass member 32 within the enclosure, while the tapered end 36 is blunted to the extent that the mass member 32 cannot become wedged within the enclosure.

The accelerometer 30 serves to detect a deceleration threshold which produces a signal to commence the brake light flashing. To this end, a position detector 40, which is a photo interrupter in the illustrated embodiment, includes a first interrupter member 42, which includes an emitter 44, and second interrupter member 46, which includes a detector 48. The first interrupter member 42 is positioned relative to the second interrupter member 46 such that a continuous signal is transmitted in a direct path from the emitter 44 to the detector 48. This continuous signal defines a beam diagrammatically depicted at 50. When the mass member 32 obstructs the path of the beam 50, a corresponding indication is produced by position detector 40.

The guide 34 is symmetric along its longitudinal axis 52 that is horizontally oriented when the device 10 is mounted in a taillight fitting. The position detector 40 is disposed about the guide 34 such that the beam 50 is substantially orthogonal to the axis 52. Considering this configuration, it can be observed that the guide 34 obstructs the path of the beam 50, however, because the guide 34 is of transparent material, it does not interrupt the beam 50. The position detector 40 is further disposed near the tapered end 36 such that when the mass member 32 engages the tapered end 36, the beam 50 is broken and a corresponding signal is produced by the accelerometer 30 to commence the brake light flashing. The guide 34 is secured in the discussed configuration by suitable supports 54, which secure the device to the interior sidewall of the housing 12.

When installed within a vehicle, the accelerometer 30 is oriented such that the axis 52 is substantially parallel with the length of the vehicle. Further, the tapered end 36 is the leading end of the guide 34 when the vehicle is traveling forward. It is understood that while the vehicle is at rest, accelerating, or traveling at a constant velocity, the mass member 32 will rest against the base end 38. As the vehicle decelerates, the mass member 32, due to the law of inertia, has the tendency to roll up the incline produced by the guide 34. If the deceleration is great enough, the mass member 32 climbs the incline until it engages the tapered end 36. As discussed, if the mass member 32 engages the tapered end 36, the beam 50 is broken and a corresponding signal is produced. Therefore, considering an angle of incline $\theta$ and the attributes of the mass member 32, the deceleration required to move the mass member 32 from the base end 38 to the tapered end 36 can be calculated. Understanding this calculation, the angle of incline $\theta$ can be manipulated such that the occurrence of the mass member 32 engaging the tapered end 36 indicates a particular value of deceleration. This particular value of deceleration is the discussed predefined deceleration threshold. When this threshold is exceeded, a corresponding signal is produced to indicate this condition to the warning device 10 such that the brake lights will flash.

Because the installation process includes securing the bayonet-type connector 18 to an OEM fitting, rotation of the warning device 10 about the axis 52 is required. The rotations necessary to secure the warning device 10 vary from one vehicle to another, thus varying the final rotational orientation of an installed device. The configuration of the conical guide 34 provides infinite rotational orientations suitable for the operation of the warning device 10. Therefore, regardless of the rotations required to secure the warning device 10 to a particular brake light/taillight fitting, the warning device 10 will operate as designed. This attribute further compliments the presented plug-and-play feature of the warning device.

Figure 3B:
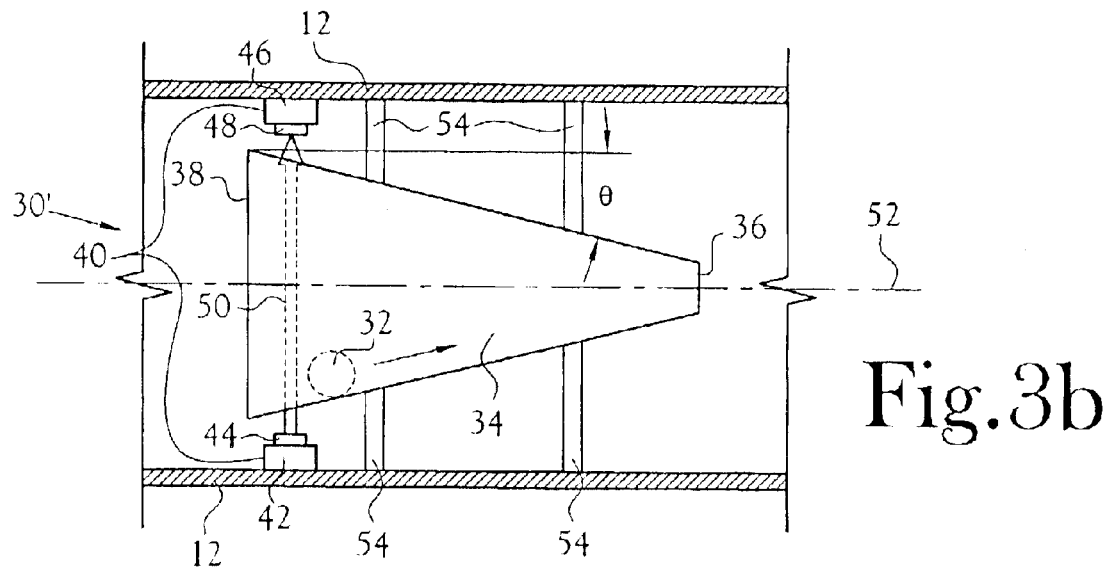

FIG. 3b depicts an alternate configuration for the accelerometer 30 of FIG. 3a. In this particular embodiment the position detector 40 is disposed near the base end 38 such that when the mass member 32 vacates the base end 38 to the extent that the beam 50 engages the detector 48, a circuit is completed and a corresponding signal is produced by the accelerometer 30 to commence the brake light flashing. As with the accelerometer 30 of FIG. 3a, considering the angle of incline θ of the accelerometer 30' of FIG. 3b and the attributes of the mass member 32, the deceleration required to move the mass member 32 from the base end 38 in order to complete the aforementioned circuit can be calculated. Understanding this calculation, the angle of incline θ can be manipulated such that the occurrence of the beam 50 engaging the detector 48 indicates a particular value of deceleration. This particular value of deceleration is the discussed predefined deceleration threshold.

Figure 3C:
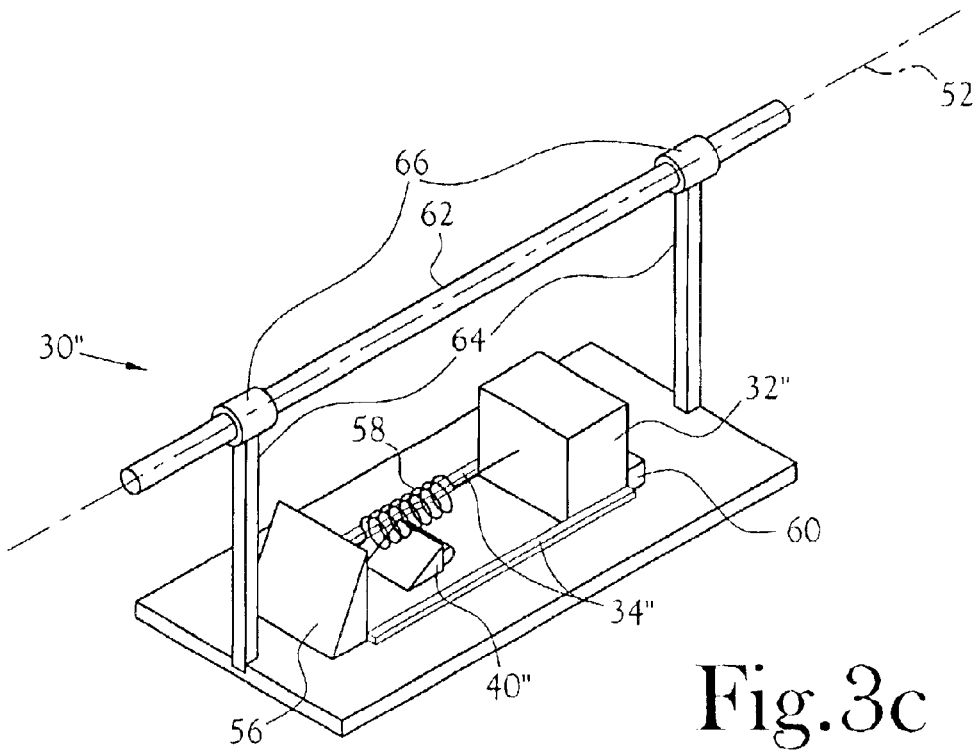
FIG. 3c is a perspective view of another accelerometer including a mass and spring and constructed in accordance with various features of the present invention.

FIG. 3c depicts an alternate embodiment of the accelerometer 30 of FIG. 3a. The accelerometer 30" of this particular embodiment employs a spring and mass based system where the mass member 32" defines an electrically conductive block and the guide 34" defines a track that restricts the movement of the mass member 32" to a single dimension that is parallel to the axis 52. Those skilled in art will recognize that a mass member 32" other than a block may be used without interfering with the scope or spirit of the present invention. The mass member 32" is attached to a spring mount 56 by way of a spring 58 whose length is positioned parallel to the axis 52. The spring mount 56 is disposed at the leading end of the accelerometer 30" when an equipped vehicle is traveling forward. As an equipped vehicle decelerates, the law of inertia forces the mass member 32" in the direction of the spring mount 56, which incidentally forces the mass member 32" against the force of the spring 58. The rigidity of the spring 58 is calibrated such that the mass member 32" engages the position detector 40", which defines an electrical contact in this particular embodiment, upon a vehicular deceleration greater than the predefined deceleration threshold. The engagement of the mass member 32" and the position detector 40" completes a circuit that indicates to the warning device 10 an abnormally intense vehicular deceleration, which activates the flashing taillights. The accelerometer 30" of this particular embodiment also comprises a spring stopper 60 that prevents the spring 58 from overextending and pretensions the mass member 32" to reduce bouncing in order to ensure designed operation.

In order to equip the accelerometer 30" with infinite operational orientations about the axis 52, a shaft 62 is disposed symmetrically about its longitudinal axis 52 within the warning device 10. Shaft supports 64 are connected to the guide 34" and further connected to the shaft 62 by way of bearings 66. This configuration permits gravity to force the accelerometer 30" into a proper operating position regardless of the rotational orientation of the warning device 10 after instillation.

Figure 3D:
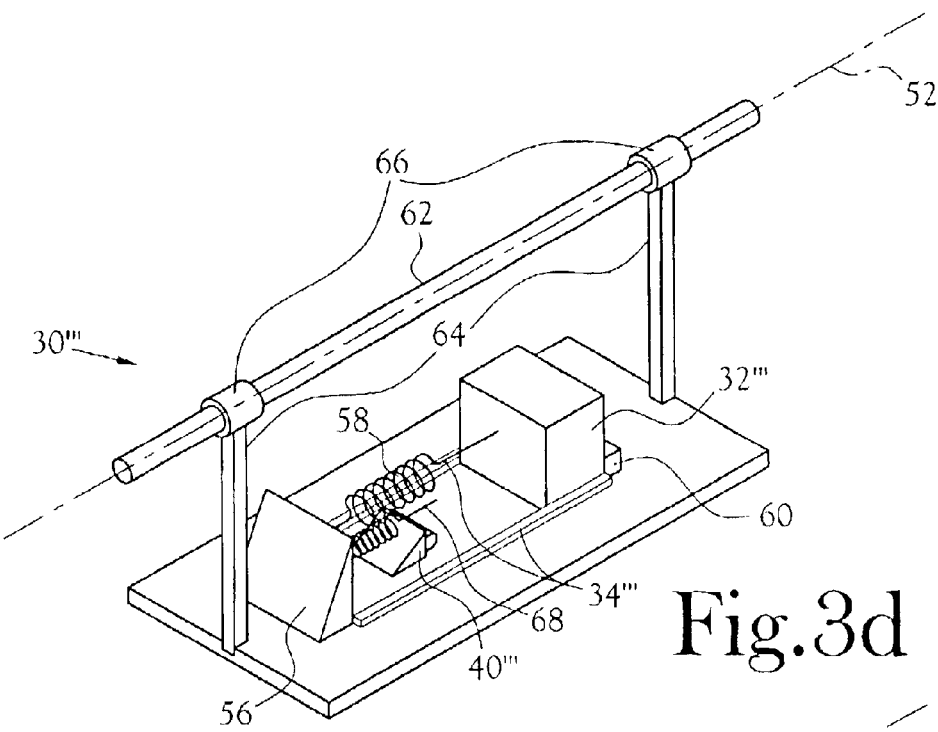
FIG. 3d is a perspective view of an alternate embodiment of the spring and mass based accelerometer of FIG. 3c.

FIG. 3d depicts a second alternate embodiment of the accelerometer 30 of FIG. 3a. The accelerometer 30''' of this particular embodiment is the accelerometer 30" of FIG. 3c including a second spring 68 that is connected to the spring mount 56 and is parallel and proximate to the spring 58. The second spring 68 extends from the spring mount 56 a distance that leaves an open-end of the second spring 68 between the position detector 40''' and the mass member 32'''. As the spring 58 compresses during an abnormally intense vehicular deceleration, the mass member 32''' first engages the second spring 68, activating a first frequency of flashing taillights. As the spring 58 further compresses, the mass member 32''' engages the position detector 40''', activating a second frequency of flashing taillights. Therefore, the accelerometer 30''' of this particular embodiment indicates multiple severities of vehicular deceleration.

Those skilled in the art will recognize that employing a variable resister along the guide 34''', such that the value of the resister is relative to the position of the mass member 32''' along the guide 34''', may be used to indicate various deceleration severities by coupling resister values with taillight flashing frequencies.

Figure 3E:
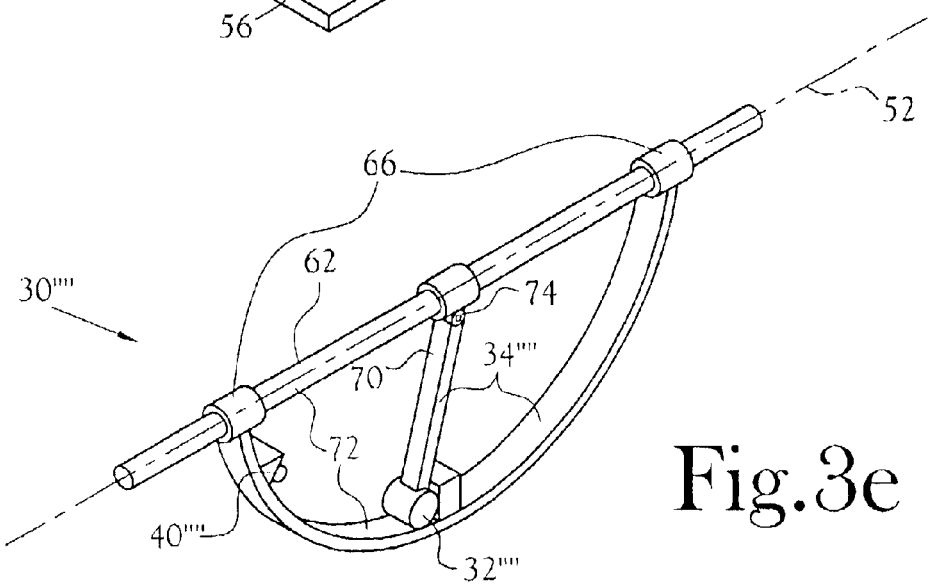
FIG. 3e is a perspective view of a pendulum based accelerometer constructed in accordance with various features of the present invention.

FIG. 3e depicts a third alternate embodiment of the accelerometer 30 of FIG. 3a. The accelerometer 30"" of this particular embodiment employs a pendulum based system where the mass member 32"" defines a cylinder disposed at a first end of a pendulum arm 70 and the guide 34"" defines the pendulum arm 70 attached to a pendulum frame 72 by way of a hinge 74. Those skilled in the art will recognize that a mass member 32"" other than a cylinder may be used without interfering with the scope or spirit of the present invention. The pendulum frame 72 is constructed such that the shaft 62 of the frame is symmetric along its longitudinal axis 52 and connects to the remainder of the guide 34"" by way of bearings 66, allowing the remainder of the guide 34"" to hang under the force of gravity, permitting the accelerometer 30"" to be in proper operating position regardless of the rotational orientation of the warning device 10 about axis 52.

In this particular embodiment, the position detector 40"" and the mass member 32"" are electrical contacts. The position detector 40"" is disposed in the hinge 74 restricted path of the mass member 32"". The position detector 40"" is further disposed toward the leading end of the accelerometer 30"" when the equipped vehicle is traveling forward. The mass member 32"", due to the law of inertia, swings to engage the position detector 40"" upon a vehicular deceleration greater than the predefined deceleration threshold. More specifically, when the mass member 32"" engages the position detector 40"", a circuit is completed that indicates to the warning device 10 an intense vehicular deceleration, which subsequently activates the flashing taillights. The accelerometer 30"" of this particular embodiment also comprises a pendulum stopper that prevents the mass member 32"" from swinging uncontrollably and pretensions the mass member 32"" such that bouncing is reduced in order to ensure designed operation.

Those skilled in the art will recognize that employing a variable resister along the guide 34"", such that the value of the resister is relative to the position of the mass member 32"" along the guide 34"", may be used to indicate various deceleration severities by coupling resister values with taillight flashing frequencies.

Figure 3F:
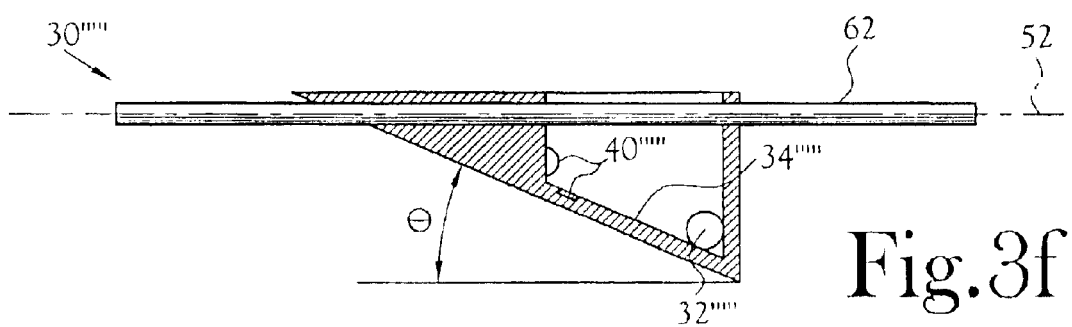
FIG. 3f is a sectional side elevation view of a rolling ball based accelerometer constructed in accordance with the various features of the present invention.

FIG. 3f depicts a fourth alternate embodiment of the accelerometer 30 of FIG. 3a. The accelerometer 30''''' of this particular embodiment employs an inclined plane based system where the mass member 32''''' defines an electrically conductive sphere, the guide 34''''' defines an enclosed inclined plane, and the position detector 40''''' comprises electrical contacts disposed at the top of the inclined plane, which is the leading end of the accelerometer 30''''' when the equipped vehicle is traveling forward. The accelerometer 30''''' operates similar to the accelerometer 30 of FIG. 3a in that the angle θ defines the deceleration threshold, and as an equipped vehicle decelerates at a value greater than the predefined deceleration threshold, the mass member 32''''' rolls up the guide 34''''', due to the law of inertia, and engages the position detector 40''''', which produces a signal to indicate this condition to the warning device 10 such that the brake lights will flash.

In order to equip the accelerometer 30''''' with infinite operational orientations about the axis 52, the shaft 62 is disposed symmetrically about its longitudinal axis 52 within the warning device 30'''''. The shaft 62 is attached to the accelerometer 30''''' above the inclined plane and such that the guide 34''''' rotates freely about the shaft 62. This configuration permits gravity to force the accelerometer 30''''' into proper operating position regardless of the rotational orientation of the warning device 10 about the axis 52.

Considering the construction and operation of the various embodiments of the accelerometer 30, it is understood that the operational behavior of the warning device 10 will not be consistent as an equipped vehicle travels on level, inclined, and declined surfaces. More specifically, as the vehicle travels an inclined surface, gravity will cause the warning device 10 to assume a deceleration threshold value that is greater than the threshold value of the device while traveling on a level surface, thus giving the warning device 10 a slower reaction time to an abnormally intense vehicular deceleration. This condition is acceptable because following drivers require less distance to stop a vehicle while traveling uphill. Similarly, as the vehicle travels a declined surface, gravity will cause the warning device 10 to assume a deceleration threshold value that is less than the threshold value of the device while traveling on a level surface, thus equipping the warning device 10 with a quicker reaction time to an abnormally intense vehicular deceleration. This feature is much desired because a following driver requires more distance to stop a vehicle traveling downhill.

Figure 4:
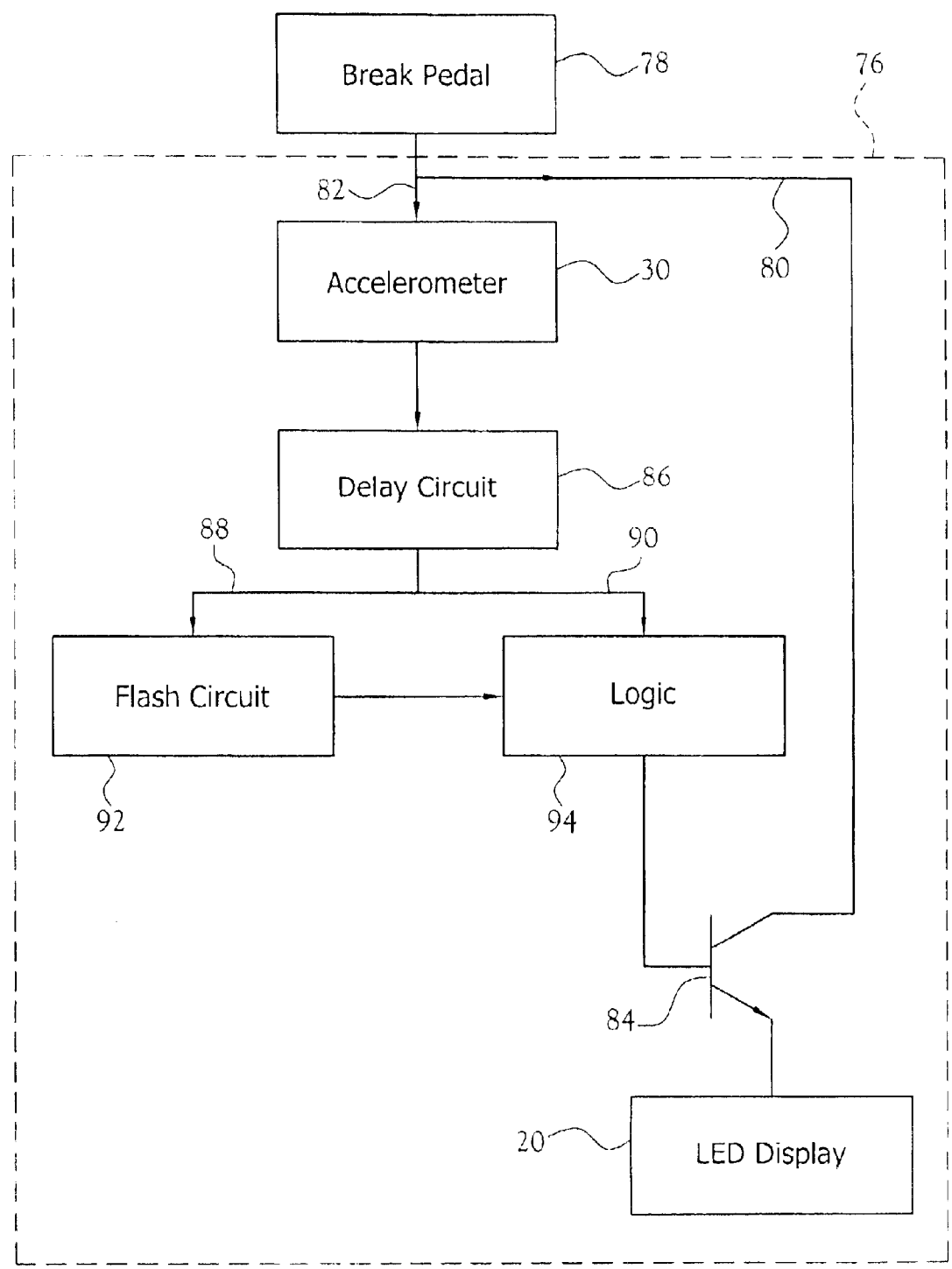
FIG. 4 is a block diagram illustrating the electrical circuitry of the warning device of FIG. 1.

FIG. 4 illustrates a block diagram 76 depicting the electrical circuitry of the warning device 10. When the brake pedal 78 of a conventional vehicle is applied, initiating deceleration, it produces an electrical signal that travels a first path 80 and a second path 82, simultaneously. The first path 80 directs the signal to the source lead of a transistor 84 while the second path 82 directs the signal to the accelerometer 30. The accelerometer 30 essentially acts as a switch, opening the circuit if a deceleration less than the predefined threshold is detected, and completing the circuit if a deceleration greater than or equal to the predefined threshold is detected. If a severe deceleration is detected, the signal proceeds to a delay circuit 86, such as a Hysteresis circuit in the illustrated embodiment. The delay circuit 86 is employed to stabilize the signal if the deceleration is fluctuating around the threshold value. Therefore, a constant signal is produced by the delay circuit 86 if the accelerometer 30 is rapidly opening and closing the circuit. Further, the delay circuit 86 provides an extended warning for the occurrence of a brief severe deceleration. The delay circuit outputs a signal that travels a path 88 and a second path 90. The path 88 directs the signal to a flash circuit 92 that outputs a pulsing version of the incoming constant signal that pulses at a predefined frequency. The signal directed to the second path 90 and the output signal of the flash circuit 72 are inputs to logic 94 in the illustrated embodiment. The logic 94 dictates whether its output signal is a constant signal, due to the accelerometer 30 opening the circuit, or the output signal of the flash circuit 92, due to the accelerometer 30 closing the circuit. This output signal travels to the gate lead of the transistor 84 in the illustrated embodiment. The LED display 20 is connected to the drain lead of the transistor 84. When a constant signal is delivered to the LED display 20, a conventional brake light illumination is realized. When a pulsing signal is delivered to the LED display 20, a flashing illumination is realized indicating deceleration above a preselected threshold.

From the foregoing description, those skilled in the art will recognize that a device for indicating the severe deceleration of a vehicle offering advantages over the prior art has been provided. The device provides an onboard accelerometer and illumination element, thus eliminating the requirement of integration with an equipped vehicle to acquire these elements. Further, the system provides a plug-and-play feature in that the installation of the device is equivalent to that of a replacement taillight.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, We claim:

1. An integrated warning device for being mounted in a taillight fitting of a standard, equipped, motorized vehicle and for providing flashing brake lights when deceleration of the vehicle exceeds a predefined deceleration threshold, said device comprising:

a housing having a mounting element for being received in the taillight fitting of the vehicle and for establishing electrical communication between the vehicle and said device;

a spherical mass member carried interior of a guide within said housing whereby said mass member moves unrestricted within said guide in response to deceleration above a predefined threshold to a preselected location;

a detector for sensing movement of said mass member to said preselected location;

an illumination element for emitting light; and an electrical circuitry providing electrical communication between the vehicle, said detector, and said illumination element, said electrical circuitry activating said illumination element thereby causing flashing in response to sensing said mass member at said preselected location indicating vehicle deceleration above a threshold level.

2. An integrated warning device for being mounted in a taillight fitting of a standard equipped, motorized vehicle and for providing flashing brake lights when deceleration of the vehicle exceeds a predefined deceleration threshold, said device comprising:

a mass member;

a conically shared guide for defining a path in which said mass member travels;

a detector for identifying the position of said mass member at a location along said path indicating that deceleration of the vehicle has reached a threshold value;

an illumination element for emitting light;

an electrical circuitry providing electrical communication between the vehicle, said detector and said illumination element, said electrical circuitry activating said illumination element in response to deceleration of said equipped vehicle above a threshold level; and a housing for said warning device and including a mounting element for being received in the taillight fitting of a vehicle and for establishing electrical communication between the vehicle and said device, said mounting element cooperating with said standard taillight socket to provide a plug-and-play feature;

wherein said mass member is a sphere such that movement of said sphere within said conically shaped guide is independent of the rotational position of said warning device.

3. The device of claim 2 wherein said detector comprises a photo interrupter which generates a signal indicative of said mass member moving to a preselected location indicating that the vehicle deceleration has exceeded a threshold level.

4. The device of claim 2 wherein said illumination element comprises a light emitting diode (LED) which flashes upon vehicle deceleration above a threshold level.

5. The device of claim 2 wherein said illumination element comprises a plurality of light emitting diodes (LEDs).

6. The device of claim 2 wherein said electrical circuitry cycles the illumination element through an ON state and an OFF state upon said detector detecting the position of said mass member that indicates a deceleration exceeding a preselected deceleration threshold.

7. The device of claim 2 wherein said electrical circuitry provides a delayed discontinuation of said cycling of said illumination element with regard to said mass member assuming a position that indicates a deceleration below said predefined deceleration threshold.

8. An integrated warning device for being mounted in a taillight fitting of a standard, equipped, motorized vehicle and for providing flashing brake lights when deceleration of the vehicle exceeds a predefined deceleration threshold, said device comprising:

an accelerometer disposed to rotate about a longitudinal axis within said warning device, said accelerometer including a mass member bounded by a guide through which said mass member moves unrestricted during deceleration of the vehicle, said accelerometer is rotatable about said axis such that movement of said mass member bounded by said guide is independent of the rotational position of said warning device;

an illumination element for emitting light;

electrical circuitry providing electrical communication with the vehicle, said accelerometer, said illumination element, said electrical circuitry activating said illumination element in response to the vehicle's deceleration exceeding a predetermined threshold causing a preselected signal to be generated by said accelerometer; and a housing for carrying said accelerometer, said illumination element, and said electrical circuitry, said housing including a mounting element for being received within a standard taillight fitting of the vehicle for establishing electrical communication between the vehicle and said warning device upon insertion to provide a plug-and-play feature.

9. An integrated warning device for being mounted in a taillight fitting of a standard, equipped, motorized vehicle and for providing flashing brake lights when deceleration of the vehicle exceeds a predefined deceleration threshold, said device comprising:

a housing having a mounting element for being received in the taillight fitting of the vehicle and for establishing electrical communication between the vehicle and said device;

a mass member carried by said housing whereby said mass member pivotably moves in response to deceleration above a predefined threshold to a preselected location, movement of said mass member being impacted by the traveling of an equipped vehicle along an inclined surface or declined surface such that said movement of said mass member is retarded or enhanced respectively due to the increase or decrease of the angle of incline;

a detector for sensing movement of said mass member to said preselected location;

an illumination element for emitting light; and an electrical circuitry providing electrical communication between the vehicle, said detector, and said illumination element, said electrical circuitry activating said illumination element thereby causing flashing in response to sensing said mass member at said preselected location indicating vehicle deceleration above a threshold level.

10. An integrated warning device for being mounted in a taillight fitting of a brake light equipped vehicle and for providing flashing brake lights when deceleration of the vehicle exceeds a predefined deceleration threshold, said device comprising:

a mass member;

a guide having an enclosed inclined plane for defining a path in which said mass member travels in unrestricted movement during deceleration of the vehicle, whereby movement of said mass member is impacted by the vehicle traveling along an inclined surface or declined surface such that movement of said mass member through said guide is retarded or enhanced respectively due to the increase or decrease in angle of the surface traveled by the vehicle;

a detector for identifying the position of said mass member at a location along said path indicating that deceleration of the vehicle has reached a threshold value;

an illumination element for emitting light;

an electrical circuitry providing electrical communication between the vehicle, said detector, and said illumination element, said electrical circuitry activating said illumination element in response to deceleration of said equipped vehicle above a threshold level; and a housing for said warning device and including a mounting element for being received in the taillight fitting of a vehicle and for establishing electrical communication between the vehicle and said warning device, said mounting element cooperating with said standard taillight socket to provide a plug-and-play feature.

11. The warning device of claim 10 wherein said housing includes a shaft aligned along a longitudinal axis of said housing in which said guide is disposed, said guide is pivotably attached to said shaft whereby said guide rotates freely about said shaft such that movement of said mass member in said guide having said enclosed inclined plane is independent of the rotational position of said mounting element of said housing being received in the taillight fitting of the vehicle.

12. The warning device of claim 10 wherein said detector comprises a photo interrupter which generates a signal indicative of said mass member moving to a preselected location in said guide having said enclosed inclined plane thereby indicating that the vehicle deceleration has exceeded said threshold level.

* * * * *